Aug. 10, 1948.  G. J. YEVICK  2,446,863
ADJUSTABLE TRANSMISSION LINE
Filed Jan. 7, 1946

INVENTOR
GEORGE J. YEVICK
BY
William D. Hall.
ATTORNEY

Patented Aug. 10, 1948

2,446,863

UNITED STATES PATENT OFFICE 2,446,863

ADJUSTABLE TRANSMISSION LINE

George J. Yevick, Boston, Mass., assignor, by mesne assignments, to the United States of America as represented by the Secretary of War Application January 7, 1946, Serial No. 639,644

3 Claims. (Cl. 178—44)

This invention relates to transmission lines, and more particularly to means for varying the electrical length of wave guide transmission lines.

It is frequently desirable, in wave guide transmission lines, to alter the electrical length of the line for impedance matching purposes, or for other reasons well known to the art. It is further desirable that such means for altering the wave guide electrical length shall introduce very little energy loss.

Therefore, among the objects of this invention are to provide means for adjusting the electrical length of a wave guide; to provide such means which will introduce only small energy losses into the system wherein it is utilized; to provide such means which are readily and economically constructed; and to provide such means which are easy to adjust.

Further objects, advantages, and novel features of the invention will become apparent in the following description, wherein reference is made to the accompanying drawing illustrating cross-sectional views of a preferred embodiment of the invention.

In the drawing, in which like parts are designated by like reference numerals:

The illustrated embodiment of the invention includes rotor and stator members forming the inner and outer walls, respectively, of an annular wave guide. The annular wave guide communicates through two openings in the outer wall with a wave guide transmission line. Reflecting teeth are used to guide the transmission line energy through the annular wave guide. The length of the path traveled by the wave energy within the annular wave guide varies with the relative rotational displacement of the rotor member, and a readily adjustable line stretcher is thus provided.

Figure 1:
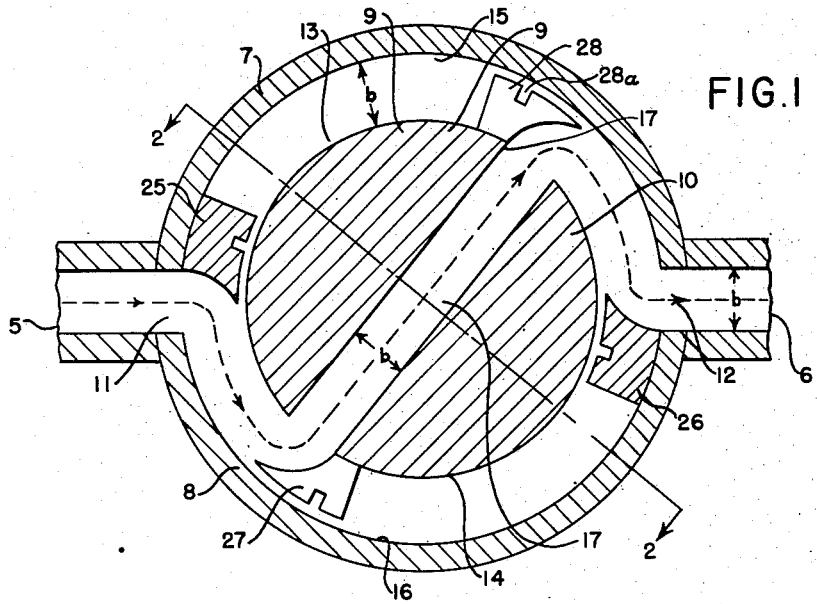
Fig. 1 is a cross-sectional view of an embodiment of the present invention.
Figure 2:
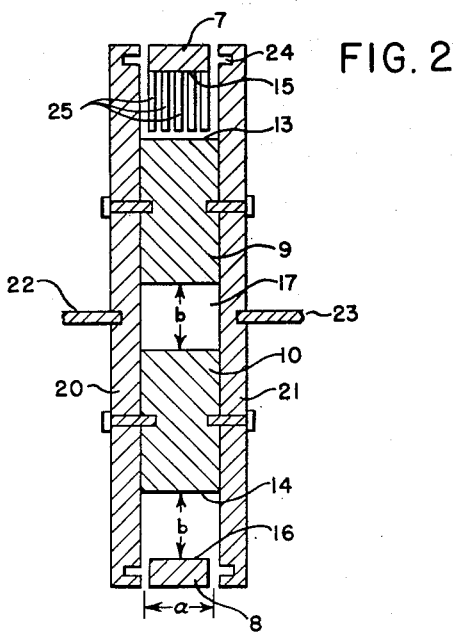
Fig. 2 is another cross-sectional view of the same embodiment taken on the line 2—2 of Fig. 1.

Referring now to Figs. 1 and 2, wave guides 5 and 6 are part of a wave guide transmission line. Stator members 7 and 8 and rotor members 9 and 10 define an annular wave guide of rectangular cross-section having wide and narrow dimensions $a$ and $b$, respectively, as shown. Wave guides 5 and 6 are joined to members 7 and 8 to communicate with the annular wave guide through diametrically opposed apertures 11 and 12. Rotor members 9 and 10, respectively, afford conductive surfaces 13 and 14 which oppose the cylindrical surface 15, 16 defined by stator members 9 and 10, the inner and outer surfaces or walls 13, 14, 15 and 16 defining the annular wave guide. The narrow dimension $b$ of the annular wave guide preferably corresponds to the distance between broad walls of rectangular wave guides 5 and 6, as shown.

Rotor members 9 and 10 define therebetween a diametral passage 17 communicating at each end with the annular wave guide. The conductive walls of the passage 17 are separated preferably by the distance $b$, as shown. Side plates 20 and 21 are secured as shown to rotor members 9 and 10, as shown in Fig. 2. Rotor members 9 and 10 are slightly thicker than stator members 7 and 8, in order to provide clearance between the side plates 20 and 21 and the stator members 7 and 8. Plates 20 and 21 are mounted on aligned shafts 22 and 23 to permit rotational displacement of the rotor formed by members 9 and 10 relative to the stator formed by members 7 and 8. Shafts 22 and 23 may be journaled in supports, not shown, secured to the transmission line. Plates 20 and 21 may have annular slot 24, of quarter wavelength depth electrically, and spaced radially a quarter wavelength electrically from the outer walls 15, 16 of the annular wave guide. The slots effectively prevent wave energy from leaking through the space between the stator and the side plates.

Referring again to Fig. 1, sets of reflecting teeth 25 and 26 are secured to the outer walls or surfaces 15 and 16, respectively, each set being placed at the clockwise edges of apertures 11 and 12, and extending into the annular wave guide formed by the cylindrical surfaces. Similarly, sets of reflecting teeth 27 and 28 are secured to inner walls 13 and 14, respectively, to extend into the annular wave guide space. Teeth 27 and 28 are placed at the counter-clockwise edges of the apertures formed in the rotor by passage 17. Preferably, reflecting teeth 27 and 28 are arranged to slip between reflecting teeth 25 and 26, to allow complete freedom of motion of the rotor.

Reflecting teeth 25, 26, 27 and 28 operate as reflectors for the wave energy, and bar passage of the wave energy therethrough. The reflecting teeth shown are metallic slabs spaced closer together than the spacing for cut-off at the highest contemplated operating frequency. The teeth are provided with slots which are one-quarter wavelength depth, electrically, and which are at an electrical quarter wavelength from the points of the teeth. The effect of such tooth construction is substantially equivalent to that of a solid metallic plate extending between the cylindrical surfaces and in electrical contact therewith to provide an electrical reflecting surface. Metallic finger-like elements, or solid metallic sheets could be used instead of the reflecting teeth here described. The reflecting or guiding elements shown, however, are preferable.

Wave energy in the transmission line of the structure described, polarized parallel to the plane of the view of Fig. 1, is directed by the reflecting teeth circumferentially through the annular wave guide space. For example, assume an incident wave traveling from left to right through wave guide 5 in Fig. 1. Reflecting teeth 25 direct the incident energy circumferentially in the annular space in a counterclockwise direction toward reflecting teeth 27, which in turn direct it through the diametral passage 17 toward reflecting teeth 28. In turn, reflecting teeth 28 direct the energy circumferentially in a clockwise direction through the annular space to reflecting teeth 26, which direct the energy out through wave guide 6.

Thus, the present invention affords a means for varying the length of path traversed by guided wave energy, simply by rotational displacement of the inner structure of the embodiment disclosed. Variation of the path length, of course, varies the electrical length of the wave guide transmission line of which the structure here described forms a part, and correspondingly varies the phase of wave energy transmitted thereby. If the annular space is at least one wavelength long, the total variation in the electrical length of the line may be made to vary over a full three hundred and sixty electrical degrees.

The disclosed embodiment is compact as compared to prior art means for accomplishing a variation in electrical line lengths. A further advantage of the disclosed embodiment is that it substantially matches the wave guide transmission line, so that no undesirable reflections are set up in the transmission line.

It will be apparent to those skilled in the art that the disclosed structure is electrically linear and reversible, that is, there will be the same line-lengthening effect for energy traveling from wave guide 5 to wave guide 6 as there is for energy traveling in a reverse direction. It will also be apparent to those skilled in the art that there are many variations of the invention, and that various equivalents may be used in the structure disclosed. Therefore, the appended claims are to be construed to include all variations and equivalents that fall within the scope and spirit of the invention.

What is claimed is:

1. An electromagnetic energy - transference structure including a cylindrical stator member and a cylindrical rotor member forming respectively the outer and inner walls of an annular wave guide, said stator member having diametrically opposed energy inlet and energy outlet apertures to communicate with a wave guide transmission line, said rotor member having a diametral passage to communicate at each end with said annular wave guide, and energy reflective means extending into the annular wave guide and placed at clockwise edges of the apertures in the stator member and at counter clockwise edges of the ends of the diametral passage in the rotor member whereby the path length of electromagnetic energy through said annular wave guide is altered by rotational displacement of said rotor member.

2. An electromagnetic energy - transference structure as defined in claim 1 in which said energy reflective means comprise a plurality of spaced plates, the plates of the stator member being staggered with respect to the plates of the rotor member to permit free rotation of said rotor.

3. An electromagnetic energy transference structure including an input wave guide and an output wave guide spaced from each other, a cylindrical stator interconnecting said input and output wave guides, said stator having diametrically opposed energy inlet and outlet apertures aligned with said input and output wave guides respectively, a cylindrical rotor fitting into said stator, said rotor being of smaller diameter than the inner diameter of said stator, side plates carried by said rotor, said plates closing off on two sides the space between said stator and rotor, said space constituting an annular wave guide formed between said stator, rotor and said plates, a diametral passage through said rotor member communicating at each end with said annular wave guide, and four energy-reflective teeth extending into said annular wave guide, two of said teeth being mounted on said stator and the other two teeth being mounted on said rotor, said teeth being oriented to direct said energy from the input wave guide to the output wave guide through said diametral passage.

GEORGE J. YEVICK.

REFERENCES CITED

The following references are of record in the file of this patent:

UNITED STATES PATENTS

| Number | Name | Date |
| --- | --- | --- |
| 2,404,399 | Pickles | July 23, 1946 |
| 2,418,809 | Albersheim | Apr. 15, 1947 |